April 10, 1956  J. F. YOUNG  2,741,100
REFRIGERATING APPARATUS
Filed Jan. 7, 1954  2 Sheets-Sheet 1

INVENTOR.
JAMES F. YOUNG
BY
HIS ATTORNEY

April 10, 1956 J. F. YOUNG 2,741,100

REFRIGERATING APPARATUS

Filed Jan. 7, 1954 2 Sheets-Sheet 2

*INVENTOR.*
JAMES F. YOUNG
BY
HIS ATTORNEY

United States Patent Office 2,741,100
Patented Apr. 10, 1956

2,741,100

REFRIGERATING APPARATUS

James F. Young, Scarsdale, N. Y., assignor to General Electric Company, a corporation of New York Application January 7, 1954, Serial No. 402,623

2 Claims. (Cl. 62—6)

My invention relates to refrigerating apparatus and more particularly to household refrigerating apparatus having a pair of diverse temperature compartments.

In apparatus of this latter type the operation of the refrigerating means is ordinarily controlled by the temperature of the lower temperature compartment. The higher temperature compartment is commonly only a slave, i. e., being refrigerated only when the lower temperature compartment sets the refrigerating means in operation or else being refrigerated from the lower temperature compartment through heat leakage or other means. The result of this is that often a very poor temperature regulation is obtained in the higher temperature compartment. The small temperature fluctuations necessary in the lower temperature compartment to set the refrigerating means in operation result in much greater fluctuations in the higher temperature compartment. These fluctuations are of course quite undesirable in that they can cause harmful effects in the food being stored in the higher temperature compartment.

It is, therefore, an object of my invention to provide new and improved means for refrigerating the higher temperature compartment of dual compartment refrigerating apparatus.

Another object of my invention is to provide a novel means for stabilizing effectively the temperature in the higher temperature compartment of two compartment refrigerating apparatus.

A further object is to provide dual compartment refrigerating apparatus in which the higher temperature compartment is refrigerated during inactive periods of the primary refrigerating means.

My invention also has as its object the provision of a novel refrigerating system for use in dual compartment diverse refrigerating apparatus in which an independent control is provided for the refrigerating means operating in the higher temperature compartment.

In carrying my invention into effect I provide refrigerating apparatus having a cabinet in which are defined a low temperature compartment and higher temperature compartment. In order to cool these compartments a separate evaporator is mounted in each and a means is provided for supplying refrigerating fluid to both evaporators. Further, according to my invention, to maintain the higher temperature compartment at a substantially constant temperature, a temperature stabilizing element is mounted therein in heat transfer relation with its evaporator. This temperature stabilizing element includes a liquid adapted to be congealed during the operation of the evaporator and to melt during inoperative periods of the evaporator. This melting, which of course occurs at a substantially constant temperature, absorbs heat from the higher temperature compartment and thereby maintains it at an even temperature. Through the choice of a liquid with a high latent heat of fusion, this constant temperature refrigeration can be made to last throughout substantially the entire inactive period of the evaporator.

The novel features which I believe to be characteristic of my invention are set forth with particularity in the appended claims. My invention, however, both as to its organization and method of operation may be best understood by reference to the following description taken in conjunction with the accompanying drawings in which:

Figure 1:
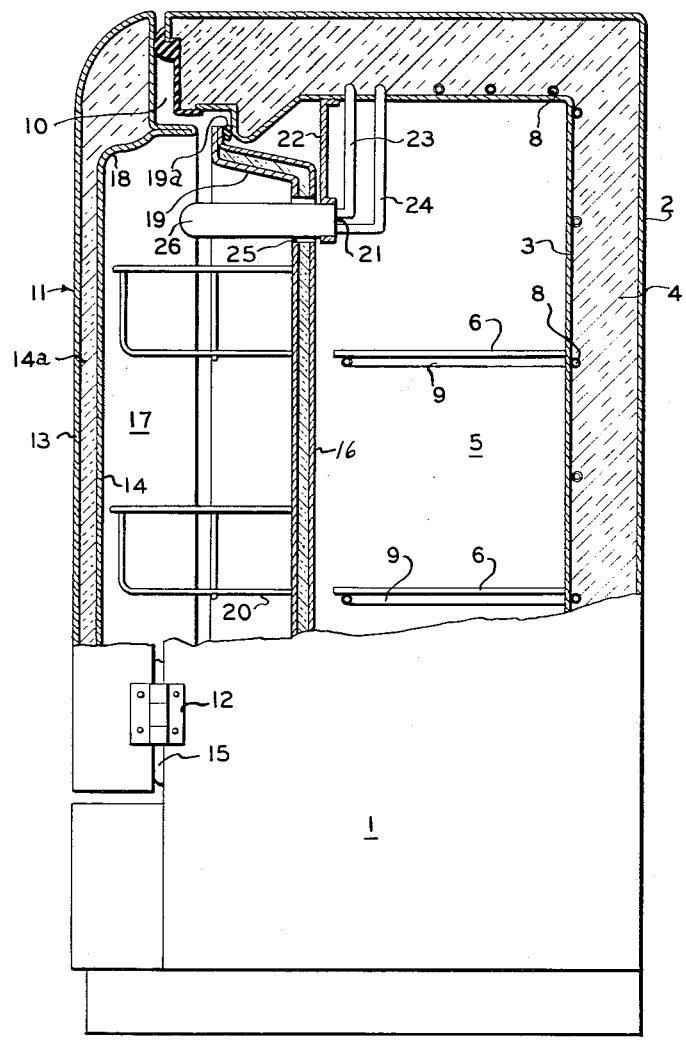
Figure 1 is a side view, partially broken away, of a two compartment, household refrigerator including my novel temperature stabilizing means in one form thereof.

Referring now to Figure 1, I have shown therein a household refrigerator 1 as exemplary of the diverse temperature refrigerating apparatus to which my invention may be adapted. This houshold refrigerator 1 includes a cabinet having an outer wall or case 2 and a spaced inner wall or liner 3. Filling the space between outer case 2 and liner 3 is a heat insulating material 4 which may be of any of the various types commonly employed for insulating refrigerator cabinets.

Figure 2:
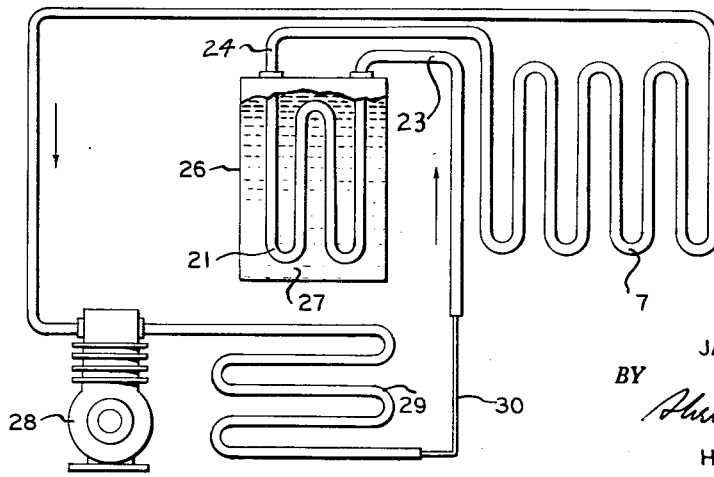
Figure 2 is a schematic showing of the refrigerating system included in the refrigerator of Figure 1.

Defined by the liner 3 is a freezing or low temperature compartment 5 which is provided with a plurality of shelves 6. Freezing compartment 5 is maintained at a satisfactory freezing temperature by an evaporator 7 which may be connected in a refrigerating system as shown in Figure 2. The evaporator 7 includes tubing passes 8 (Figure 1) which are secured in heat exchange relationship to the outer surfaces of the top, rear and side walls of the liner 3, and may also include passes 9 which extend into freezing compartment 5 and are secured in heat exchange relation to the under side of shelves 6. The exact configuration and the manner of mounting of evaporator 7 are, however, not essential to this invention.

Access to freezing compartment 5 is had through an access opening 10 and provided for closing the access opening 10 is a main door 11. This main door 11 may be secured on the outer casing by suitable hinge means, as for example by the hinges 12 only one of which is shown. The door 11 includes spaced apart inner and outer walls 13 and 14 respectively and positioned between these walls is a layer of insulating material 14a. This insulating material 14a is of a premium type and the thin layer thereof between the inner and outer walls affords substantially the same insulating effect as the thicker layers of common insulation 4 between the cabinet walls. A gasket 15 mounted on the cabinet around access opening 10 engages the inner surface of the door upon the closing thereof to seal off the cabinet effectively.

Also closing access opening 10 is an auxiliary member or door 16 which is hinged to inner liner 3. The hinging means are not shown but any suitable pivoting arrangement may be used. The auxiliary door 16 also includes spaced apart inner and outer walls between which is provided suitable insulation.

Main door 11 and auxiliary door 16 cooperate to form therebetween a higher temperature or fresh food compartment 17. Complementary recesses 18 and 19 are provided respectively in doors 11 and 16 in order to make the fresh food compartment 17 of sufficient size. A gasket 19a mounted on a protuberance formed on the inner liner 3 and extending around access opening 10 contacts the inner surface of auxiliary door 16 to seal off effectively the fresh food compartment 17 from freezing compartment 5 upon the closing of the door.

In order to support foods within fresh food compartment 17, a plurality of basket-like food shelves 20 are secured to auxiliary door 16. These shelves make maximum utilization of the space available by projecting into recess 18 in main door 11 when the main door is closed. The basket-like construction of the shelves premits circulation of air through the bottoms thereof, while the sides retain food items on the shelves during swinging movement of the auxiliary door.

However, as thus far described, the cabinet structure is not my invention but rather is shown and described in the co-pending application of Lowell M. Kurtz, S. N. 302,697, filed August 5, 1952 and assigned to the same assignee as the present invention. This cabinet structure is a very good example of the various types of plural compartment refrigerating apparatus to which my invention may be adapted; but it should be understood that my new and improved temperature stabilizing means, now to be described, are not limited in their use to this particular cabinet structure.

In accordance with my invention for providing improved temperature regulation within the higher temperature compartment of dual compartment refrigerating apparatus, I have mounted a separate evaporator 21 within fresh food compartment 17. This evaporator may be mounted in various positions within the compartment 17 but preferably it is mounted near the top as shown in Figure 1. Any suitable mounting means, as for example the depending arm 22 attached to the upper portion of liner 3, may be used to support evaporator 21. In the particular embodiment illustrated the refrigerant connections for the evaporator are also supported by the liner. Specifically, evaporator inlet and outlet tubes 23 and 24 respectively, extend downwardly from liner 3 through compartment 5 to their point of attachment to evaporator 21. The manner in which these tubes may be connected in a refrigeration system will be discussed hereinafter.

As here shown, evaporator 21 extends horizontally from the front of freezing compartment 5 through auxiliary door 16 into and partially across fresh food compartment 17. The slot 25 provided in door 16 for the purpose is of such size that the door may be readily opened without any retarding contact between it and the evaporator. In other words, slot 25 is sufficiently wide to permit movement of the door relative to the evaporator without binding.

To enable evaporator 21 to maintain a constant temperature within fresh food compartment 17, I have mounted in heat exchange relation with the evaporator a temperature stabilizing element or plate 26. This temperature stabilizing element in its preferred form comprises a container which is filled with a fluid 27 and into which the tubing of evaporator 21 is passed so that during operation of the evaporator heat will be extracted from fluid 27. Preferably the tubing is imbedded in or clamped in intimate contact with the side of the container. The container with evaporator 21 is positioned in slot 25 so that it does not impede the opening and closing of auxiliary door 16.

It should be understood though that I contemplate constructing the stabilizing element 26 in other forms besides the disclosed container type. For example, the element could be made of two concentric tubes, the inner of which would serve as evaporator 21 and the outer of which would contain the fluid 27. Any structure providing for good heat transfer between the evaporator and the fluid would be satisfactory.

But whatever the construction of the stabilizing element, the fluid 27 is especially chosen to have a high latent heat of fusion and further to have a freezing point at a temperature somewhat lower than that desired to be maintained in the higher temperature zone, i. e., fresh food compartment 17. Aqueous eutectic solutions are preferred from a functional standpoint. Specifically, strontium nitrate, potassium chloride, sodium sulfide, potassium nitrate, ammonium nitrate and sodium sulfate are several examples of the many compounds which may be dissolved in water to provide a suitable fluid. Of course it should be understood that eutectic solutions need not necessarily be used but they have provided excellent results in practice.

It is through this temperature stabilizing element 26 that I obtain the greatly reduced temperature regulation within the higher temperature compartment 17, for element 26 coacts with evaporator 21 to maintain compartment 17 at a predetermined temperature above the freezing point of liquid 27. More specifically, element 26 provides a constant temperature cooling means which may be varied in size or in freezing temperature to maintain any of a wide range of temperatures within the fresh food compartment.

To cool temperature stabilizing element 26 a variety of refrigerating systems may be used, one simple system being shown in Figure 2. In this system the freezer compartment evaporator 7 and the fresh food compartment evaporator 21 are connected serially with a compressor 28, a condenser 29 and a capillary expansion tube 30, evaporator 7 specifically being connected between evaporator 21 and the suction of compressor 28. The capillary tube 30 is positioned between condenser 29 and evaporator 21 and the condenser is joined at its other end to the outlet of compressor 28. The direction of refrigerant flow within the system is, as indicated by the arrows, outwardly from the compressor through the condenser, the capillary tube, evaporator 21, and evaporator 7 in that order and thence back to the compressor. Evaporator 21 is connected prior to evaporator 7 in the circuit so as to take advantage of the tendency of the higher temperature of the fresh food evaporator to hold the suction pressure up, which action gives a better performance for the entire system than if evaporator 7 were connected first therein. Tubes 23 and 24, of course, comprise the means whereby the evaporator 21 is connected between the capillary tube and evaporator 7.

The temperature controller for the system (not shown) is placed in the frozen food compartment 5 so that it sets compressor 28 in operation whenever the temperature of compartment 5 rises above one predetermined value and shuts off compressor 28 whenever the temperature falls below another predetermined value. In other words, compressor 28 is put in and out of operation to maintain freezer compartment 5 within a predetermined range of temperatures. But since evaporator 21 is in series with freezer compartment evaporator 7, evaporator 21 is also cooled whenever the compressor operates.

The immediate results of the operation of the refrigerating system and thus of evaporator 21 is that heat is removed from the fluid 27 contained in the temperature stabilizing member 26. This fluid, as above mentioned, has a very high latent heat of fusion so that considerable heat must be removed from it at its freezing point temperature before it freezes. And naturally, it must be frozen before it can fall to a lower temperature. Hence, during the average length period of operation of the refrigerating system the temperature of fluid 27 will not be reduced below its freezing point. Rather, fluid 27 will merely be frozen from a liquid or relatively mushy state to a somewhat harder or a completely frozen state. Of course if the primary system operates for so great a length of time that all the latent heat of fusion is removed from fluid 27, then the sensible heat of the fluid will be removed until the temperature of the primary system is reached. But as indicated above, such will not happen during the normal course of operation.

Assuming, however, that the eutectic or other fluid is frozen and then somewhat further reduced in temperature before the operation of the compressor ceases, once the compressor does cease operation the heat leakage into higher temperature compartment 17 will first raise the temperature of member 26 to the freezing temperature of fluid 27. Then further extraction of heat from the higher temperature compartment will occur at a constant temperature as fluid 27 melts. Since the latent heat of fusion is many times greater than the sensible heat required to raise the temperature of the fresh food compartment 17 from the primary temperature of the evaporator 21 to the freezing temperature of fluid 27, most of the refrigeration of the fresh food compartment takes place at the fluid freezing temperature.

As an example of the various temperatures to which this system can be adapted, suppose that it were desired to maintain the higher temperature zone at approximately 40° F. in a 100° F. room, the relative humidity of the compartment being in the neighborhood of 45%. For this application, the freezing compartment would be maintained at about 0° F., being fed with the refrigerant at −8° F. during operation of the compressor. The fluid 27, for example, a eutectic solution of strontium nitrate, would have a freezing temperature of about 20° F. and the element 26 could be easily made of the proper size to maintain the temperature of the fresh food compartment at 40° F. The average temperature of element 26 during the cycle would be the freezing temperature of the fluid 20° F., or perhaps slightly lower to about 18° F. Since the stabilizing means 26 would thus always be at or near the freezing temperature of fluid 27, essentially constant temperature refrigeration would be applied to the higher temperature compartment. Hence, little if any variation would occur in its temperature.

Figure 3:
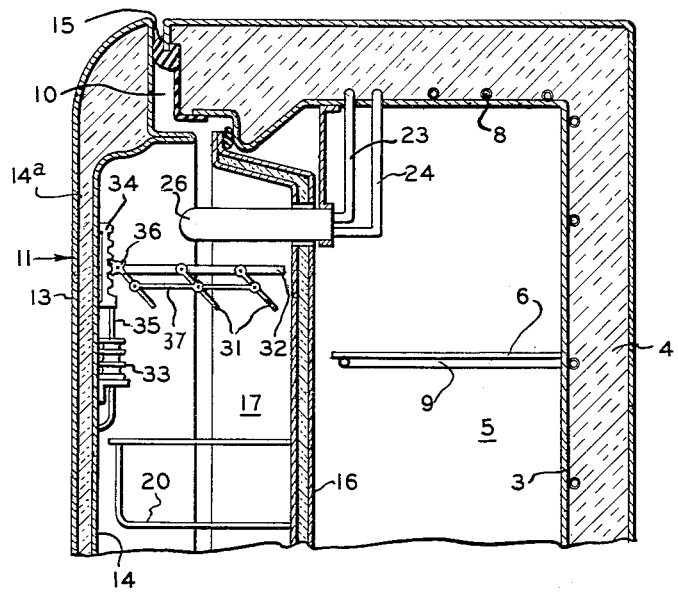
Figure 3 is a fragmentary sectional view of a two compartment, household refrigerator incorporating an improved form of my temperature stabilizing means.

In Figure 3 I have shown refrigerating apparatus similar to that shown in Figure 1 but also incorporating additional means for insuring proper regulation in the fresh food compartment temperature, even if the temperature stabilizing member 26 should fall appreciably below the freezing temperature of fluid 27. Similar members in the Figures 1 and 3 are numbered identically. The additional means for aiding in the stabilizing of the temperature of the fresh food compartment comprises a movable baffle structure here shown as the movable vanes 31 which are pivoted on a horizontally extending supporting member 32 that is itself firmly affixed to door 11. These vanes are so positioned adjacent temperature stabilizing element 26 that when moved to a horizontal position, they effectively shut off air circulation to the element, whereas when turned downwardly to the vertical position they allow relatively free air circulation thereto. At intermediate points between the horizontal and the vertical they offer more or less opposition to the flow of air. This restriction of the air circulation, of course, modifies the heat transfer rate from element 26 to the rest of the fresh food compartment.

In order to correlate the movement of these vanes or other baffle structure with the temperature of the fresh food compartment so as to maintain it substantially constant, a temperature responsive actuating member is provided. For example, a bellows 33 which is expansible in response to compartment temperatures may be used. This bellows is mounted within the fresh food compartment, as for example on the door 11, and moves a gear rack 34 by means of a plunger 35. The movement of the gear rack is translated to the vanes by means of a gear 36 which is rotatably mounted on supporting member 32. Specifically, the gear 36 is mounted on the same pivot as one of the vanes 31 and when it is turned by gear rack 34 it causes that particular vane 31 to pivot. This pivoting of the one vane is translated to the rest of the vanes by means of an operating arm 37 connected therebetween.

In operation, if the higher temperature compartment 17 falls below the desired minimum, as for example if element 26 should be carried below the freezing temperature of liquid 27 during operation of the compressor, the bellows 33 contracts causing the vanes to be swung upwardly to shut off air circulation to element 26. This of course impedes the heat transfer from the fresh food compartment to element 26 and allows the compartment temperature to rise. As it rises toward the desired value, the bellows 33 expands and moves the vanes downwardly toward a vertical position. This again allows heat transfer to take place so as to maintain the compartment at the desired temperature.

It should be understood though that bellows 33 may often operate vanes 31 even when the temperature of element 26 does remain constant at the freezing point of liquid 27. For example, an opening of door 11 would heat compartment 17 somewhat so that briefly a greater heat transfer rate would be required to bring the compartment back to the desired temperature. Moreover, the desired heat transfer heat rate would vary with the temperature of the atmosphere surrounding the freezer cabinet. Thus, the movable vanes 31 provide for better temperature regulation no matter what the condition of the primary stabilizing element. My novel combination of a temperature stabilizing member and associated means for varying the heat transfer rate thereto has been found particularly advantageous for maintaining proper temperature regulation in those freezers of the type shown in which the fresh food compartment and the freezing compartment are separated only by a movable door.

Figure 4:
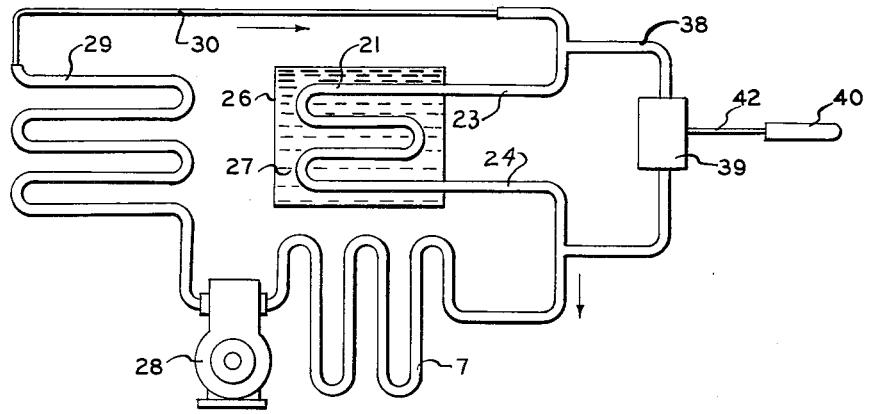
Figure 4 is a schematic showing of a novel refrigerating system for actuating my temperature stabilizing means.
Figure 5:
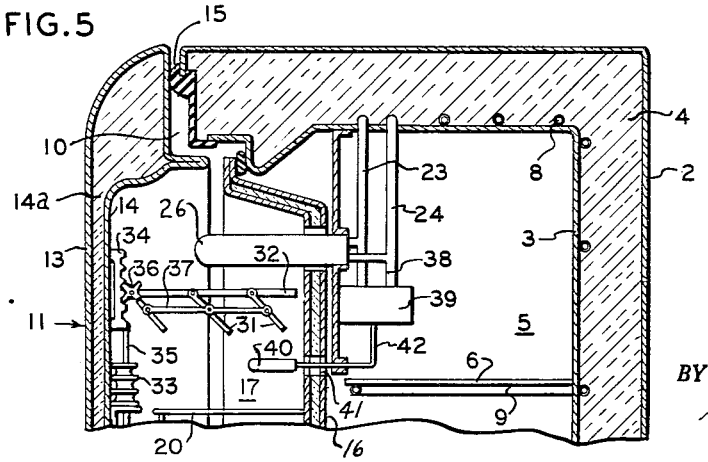
Figure 5 is a fragmentary sectional view of a two compartment, household refrigerator incorporating the refrigerating system of Figure 4.

Turning to another aspect of my invention, in Figure 4 I have shown a novel refrigerating system which is effective to provide particularly close regulation in the fresh food compartment. The manner in which it is incorporated in diverse temperature refrigerating apparatus similar to that shown in Figures 1 and 3 may be seen in Figure 5, like members in the various figures being numbered identically. This refrigerating system, just as that shown in Figure 2, comprises a compressor 28, a condenser 29, a capillary tube 30, a freezer compartment evaporator 7, and a fresh food compartment evaporator 21. Moreover, as above, the fresh food evaporator 21 has associated with it in heat transfer relationship a temperature stabilizing member 26 including a fluid 27; and again, as indicated by the arrows, evaporator 21 is positioned prior to evaporator 7 in the path of the refrigerant flow.

But according to my invention, there is further included in this circuit a bypass 38 around evaporator 21. Connected serially in this bypass is a valve 39 which may be of any of the standard valves commonly employed in refrigerating systems. Valve 39 may be either mechanically, hydraulically, or electrically controlled in response to the temperature of fresh food compartment 17; and is here shown as controlled by means of a temperature sensitive hydraulic actuating element 40 which is positioned in the fresh food compartment. As may be seen in Figure 5, a slot 41 is provided in door 16 to accommodate the control tube 42 leading from element 40 to valve 39. Slot 41 is of sufficient diameter to allow element 40 to pass therethrough when the door is swung open whereby no resistance is offered to the opening of the door.

The bypass 38 provides a means whereby the evaporator 21 may be disabled whenever the temperature in compartment 17 falls below a desired minimum. In other words, should compressor 28 be in operation when the temperature of fresh food compartment 17 is below the desired minimum, the valve 39 would be opened by the temperature responsive hydraulic actuator 40 to allow practically all of the refrigerating fluid to by-pass evaporator 21. In other words, with valve 39 opened, little or no cooling effect will be supplied to evaporator 21, even when compressor 28 is in operation. This, of course, means that the operation of the compressor and thus of the refrigerating system will not cause the temperature of the fresh food compartment 17 to fall any lower. Once again a very close regulation of the fresh food compartment temperature is obtained.

Although my novel temperature stabilizing system including the by-pass 39 may be used without any additional stabilizing means to maintain a relatively constant temperature in compartment 17, the vanes 31 may be combined therewith as shown if it is desired to obtain a particularly close regulation. When the vanes 31 are employed with the by-pass valve 40 the result is that when the temperature of compartment 17 is below the desired minimum, not only will the evaporator not be refrigerated during the operation of the compressor, but also the heat transfer rate from the fresh food compartment to the stabilizing element 26 is rendered particularly nil. With the combination of these two means it is practically impossible for the fresh food compartment temperature to fall below a desired minimum.

Now, from a consideration of the above it will be obvious to those skilled in the art that various changes and modifications may be made in the disclosed structure without departing from my invention. Therefore, while in accordance with the patent statutes I have described what at present is considered the preferred embodiment of my invention, it will be understood that in the appended claims I intend to cover all such changes and modifications as fall in the true spirit and scope of my invention.

What I claim as new and desire to secure by the Letters Patent of the United States is:

1. Refrigerating apparatus comprising a cabinet, a low temperature compartment and a higher temperature compartment defined in said cabinet, a closed regrigerating system including a first evaporator for cooling said low temperature compartment and a second evaporator for cooling said higher temperature compartment, a temperature stabilizing element mounted in said higher temperature compartment in heat transfer relation with said second evaporator and including a liquid adapted to be congealed during the operation of said second evaporator and to absorb heat from said higher temperature compartment by melting at a constant temperature during inoperative periods of said second evaporator, a movable baffle structure mounted in said higher temperature compartment adjacent said temperature stabilizing element, a temperature responsive device mounted in said higher temperature compartment for adjusting said baffle structure in response to the temperature of said higher temperature compartment to vary the heat transfer rate between said higher temperature compartment and said element, a valve connected in said refrigeration system across said second evaporator, and a tempreature responsive element mounted in said fresh food compartment for opening said valve at a predetermined temperature of said fresh food compartment, thereby to prevent said second evaporator from lowering the temperature of said fresh food compartment below said predetermined temperature during the operation of said refrigerating system.

2. Refrigerating apparatus comprising a cabinet, a low temperature compartment and a higher temperature compartment defined in said cabinet, refrigerating means including a first evaporator for cooling said low temperature compartment and a second evaporator for cooling said higher temperature compartment, a temperature stabilizing element mounted in said higher temperature compartment in heat transfer relation with said second evaporator and including a liquid adapted to be congealed during the operation of said second evaporator and to absorb heat from said higher temperature compartment by melting at a constant temperature during inoperative periods of said second evaporator, a movable baffle structure mounted in said higher temperature compartment adjacent said temperature stabilizing element, a temperature responsive device mounted in said higher temperature compartment for adjusting said baffle structure in response to the temperature of said higher temperature compartment to vary the heat transfer rate between said higher temperature compartment and said element, a valve associated with said refrigeration means operative to disable said second evaporator, and a temperature responsive element mounted in said fresh food compartment for controlling said valve to disable said second evaporator at a predetermined temperature of said fresh food compartment, thereby to prevent said second evaporator from lowering the temperature of said fresh food compartment below said predetermined temperature during the operation of said refrigerating system.

References Cited in the file of this patent

UNITED STATES PATENTS

| Number | Name | Date |
|---|---|---|
| 1,425,265 | Marshall | Aug. 8, 1922 |
| 2,133,948 | Buchanan | Oct. 25, 1938 |
| 2,133,962 | Shoemaker | Oct. 25, 1938 |
| 2,252,979 | Reiter et al. | Aug. 19, 1941 |
| 2,401,460 | Charland | June 4, 1946 |
| 2,589,550 | Iwashita | Mar. 18, 1952 |
| 2,658,355 | Katzenberger | Nov. 10, 1953 |
| 2,687,020 | Staebler et al. | Aug. 24, 1954 |